(12) United States Patent
Ansari

(10) Patent No.: US 10,711,476 B2
(45) Date of Patent: Jul. 14, 2020

(54) MODULAR UTILITIES UNIT STRUCTURE

(71) Applicant: Future Proof, LLC, Lake Quivira, KS (US)

(72) Inventor: Reza Ansari, Lake Quivira, KS (US)

(73) Assignee: Future Proof, LLC, Lake Quivira, KS (US)

(*) Notice: Subject to any disclaimer, the term of this patent is extended or adjusted under 35 U.S.C. 154(b) by 0 days.

(21) Appl. No.: 16/198,415

(22) Filed: Nov. 21, 2018

(65) Prior Publication Data

US 2019/0100934 A1 Apr. 4, 2019

Related U.S. Application Data

(63) Continuation-in-part of application No. 15/500,788, filed on Jan. 31, 2017, now Pat. No. 10,367,442, (Continued)

(51) Int. Cl.
| | |
|---|---|
| *E04H 5/02* | (2006.01) |
| *E04H 5/12* | (2006.01) |
| *B66C 23/26* | (2006.01) |
| *E04B 1/348* | (2006.01) |
| *B66C 23/20* | (2006.01) |
| *E04B 1/24* | (2006.01) |
| *E04B 1/20* | (2006.01) |
| *B65G 1/02* | (2006.01) |

(52) U.S. Cl.
CPC ............ *E04H 5/02* (2013.01); *B66C 23/205* (2013.01); *B66C 23/26* (2013.01); *E04B 1/34807* (2013.01); *E04H 5/12* (2013.01); *B65G 1/026* (2013.01); *E04B 1/20* (2013.01); *E04B 1/24* (2013.01)

(58) Field of Classification Search
CPC ..... E04H 5/20; E04H 5/12; E04B 1/20; E04B 1/24
See application file for complete search history.

(56) References Cited

U.S. PATENT DOCUMENTS

| | | | | |
|---|---|---|---|---|
| 2,499,498 A | * | 3/1950 | Hammond, Jr. .... | E04B 1/34807 52/67 |
| 3,638,380 A | * | 2/1972 | Perri ......................... | E04B 1/24 52/79.12 |

(Continued)

OTHER PUBLICATIONS

"International Search Report & Written Opinion; PCT/US2016/057179, dated Dec. 28, 2016".

*Primary Examiner* — Paola Agudelo
(74) *Attorney, Agent, or Firm* — Law Office of Mark Brown, LLC; Mark E. Brown

(57) ABSTRACT

A structure for modular utilities units includes a skeletal frame forming multiple bays, each configured for receiving a respective utilities unit. A placement subassembly is mounted on the frame and includes a utilities unit connector configured for connecting to a respective utilities unit and a lifting device configured for attachment to the connector and raising and lowering a respective utilities unit. The utilities units can provide power, telecommunications, water, data processing and other utility functions. A logistics system includes vehicles for conveying the utilities units to and from the structure. The logistics system interfaces with ground, marine and air transportation resources.

7 Claims, 5 Drawing Sheets

Related U.S. Application Data which is a continuation-in-part of application No. 14/883,335, filed on Oct. 14, 2015, now Pat. No. 9,780,720, which is a continuation-in-part of application No. 13/769,110, filed on Feb. 15, 2013, now abandoned.

(60) Provisional application No. 62/589,495, filed on Nov. 21, 2017, provisional application No. 61/600,094, filed on Feb. 17, 2012.

(56) References Cited

U.S. PATENT DOCUMENTS

| | | | |
|---|---|---|---|
| 3,719,012 A * | 3/1973 | Laurent | E04B 1/3404 52/73 |
| 3,823,520 A * | 7/1974 | Ohta | E04B 1/24 52/73 |
| 4,136,432 A | 1/1979 | Melley, Jr. | |
| 5,233,808 A * | 8/1993 | Salmenmaki | E04B 1/34807 52/234 |
| 5,528,866 A * | 6/1996 | Yulkowski | E04H 1/04 52/79.12 |
| 5,969,501 A | 10/1999 | Glidden et al. | |
| 6,393,775 B1 | 5/2002 | Staschik | |
| 6,470,630 B1 * | 10/2002 | Miyamoto | E04B 1/34807 52/64 |
| 7,047,897 B2 * | 5/2006 | Eloranta | B63B 29/025 114/65 R |
| 7,081,682 B2 | 7/2006 | Campion | |
| 7,150,153 B2 | 12/2006 | Browe | |
| 7,230,819 B2 | 6/2007 | Muchow et al. | |
| 7,239,719 B2 | 6/2007 | Muchow et al. | |
| 7,288,192 B2 | 10/2007 | Jowett | |
| 7,615,876 B2 | 11/2009 | Marshall | |
| 7,738,251 B2 * | 6/2010 | Clidaras | G06F 1/20 165/80.4 |
| 8,151,537 B2 * | 4/2012 | Pope | E04B 1/3431 52/67 |
| 8,191,321 B2 | 6/2012 | McClellan et al. | |
| 8,376,282 B2 | 2/2013 | Keller | |
| 8,593,102 B2 | 11/2013 | McGuire et al. | |
| 8,988,037 B1 | 3/2015 | Woodall et al. | |
| 9,109,814 B2 | 8/2015 | Patton | |
| 9,046,281 B2 | 12/2015 | Curran | |
| 9,221,136 B2 | 12/2015 | Ansari | |
| 9,617,748 B2 * | 4/2017 | Wilson | E04H 1/005 |
| 9,663,937 B2 * | 5/2017 | Goldman | E04B 1/3483 |
| 2006/0260672 A1 | 11/2006 | Niederer | |
| 2008/0068782 A1 | 3/2008 | Muchow et al. | |
| 2009/0229194 A1 * | 9/2009 | Armillas | E04H 1/1205 52/79.1 |
| 2011/0023864 A1 | 2/2011 | Andretich | |
| 2011/0253614 A1 | 10/2011 | Curran et al. | |
| 2012/0023716 A1 | 2/2012 | Bellacicco et al. | |
| 2012/0201016 A1 | 8/2012 | Robertson et al. | |
| 2012/0255710 A1 * | 10/2012 | Maselli | H05K 7/1497 165/80.2 |
| 2012/0266546 A1 * | 10/2012 | Gyory | E04B 1/3444 52/126.1 |
| 2013/0073099 A1 | 3/2013 | Bronicki | |
| 2014/0231284 A1 | 8/2014 | Ansari | |

* cited by examiner

MODULAR UTILITIES UNIT STRUCTURE

CROSS-REFERENCE TO RELATED APPLICATIONS

This application claims priority in U.S. Provisional Patent Application No. 62/589,485, filed Nov. 21, 2017; is related to International Application No. PCT/US2016/057179, filed Oct. 14, 2016; and is a continuation-in-part of and claims priority in application Ser. No. 15/500,788 filed Oct. 14, 2016, which is a continuation-in-part of and claims priority in U.S. patent application Ser. No. 14/883,335, filed Oct. 14, 2015, now U.S. Pat. No. 9,780,720, which is a continuation-in-part of and claims priority in U.S. patent application Ser. No. 13/769,113, filed Feb. 15, 2013, now U.S. Pat. No. 9,221,136, which claims priority in U.S. Provisional Patent Application No. 61/600,094, filed Feb. 17, 2012, all of which are incorporated herein by reference.

BACKGROUND OF THE INVENTION

1. Field of the Invention

The present invention relates generally to structures configured for utilities systems, and in particular to a multi-level structure for modular utilities units.

2. Description of the Related Art

Hybrid utilities systems have been developed for providing a wide range of utilities services in various locations. For example, electrical power, telecommunications, potable water and other functions can be accommodated in remote locations. U.S. Pat. Nos. 9,221,136 and 9,780,720 disclose transportable hybrid power systems, which can be constructed in ISO-standard shipping containers and other suitable housings. Such standardized containers have the advantage of transportability with standardized transportation equipment, such as container vessels, railroad rolling stock and over-the-road trucks and trailers. Moreover, marine, railroad and trucking terminal facilities can include gantries and other equipment for intermodal transfers and transportation of shipping containers.

Hybrid utilities units can be configured for standalone and multiple-unit deployments, e.g., in remote locations requiring utilities. For example, the hybrid utilities units can be deployed when utilities are interrupted by natural disasters.

Other hybrid utilities unit applications include multi-unit facilities, which can be located in high-density urban areas. Real estate costs tend to be relatively high in many such urban areas, including central business districts, office parks and corporate campuses. For maximizing efficiency, the utilities units can be stacked vertically using appropriate elevator and hoisting crane equipment. Such equipment should accommodate transferring the utilities units from fixed-location structures to vehicles such as trailers, railcars, marine vessels and other transportation modes. The units can thus be transported to sites requiring utilities services.

The present invention addresses these considerations with a unique and innovative structure and a logistics system and method for multiple utilities units. Heretofore there has not been available a modular utilities unit structure with the advantages and features of the present invention.

SUMMARY OF THE INVENTION

The present invention relates to a structure for utilities units in modular housings and configured for power, telecommunications and other utilities functions. The utilities units can be placed in and extracted from respective bays formed in the structure by a lifting subsystem, such as a top-mounted crane or an elevator. The modular housings can comprise standard ISO shipping containers to facilitate transportation to and from the structure. The structure configuration accommodates multiple levels of utilities units, and thus maximizes density of the resulting system for cost-efficiency, particularly in urban and other areas with relatively high real estate values. The structure can be equipped with centralized utilities for interacting with the individual units, such as centralized power, telecommunications, water, fuel and other resources.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

Figure 1:
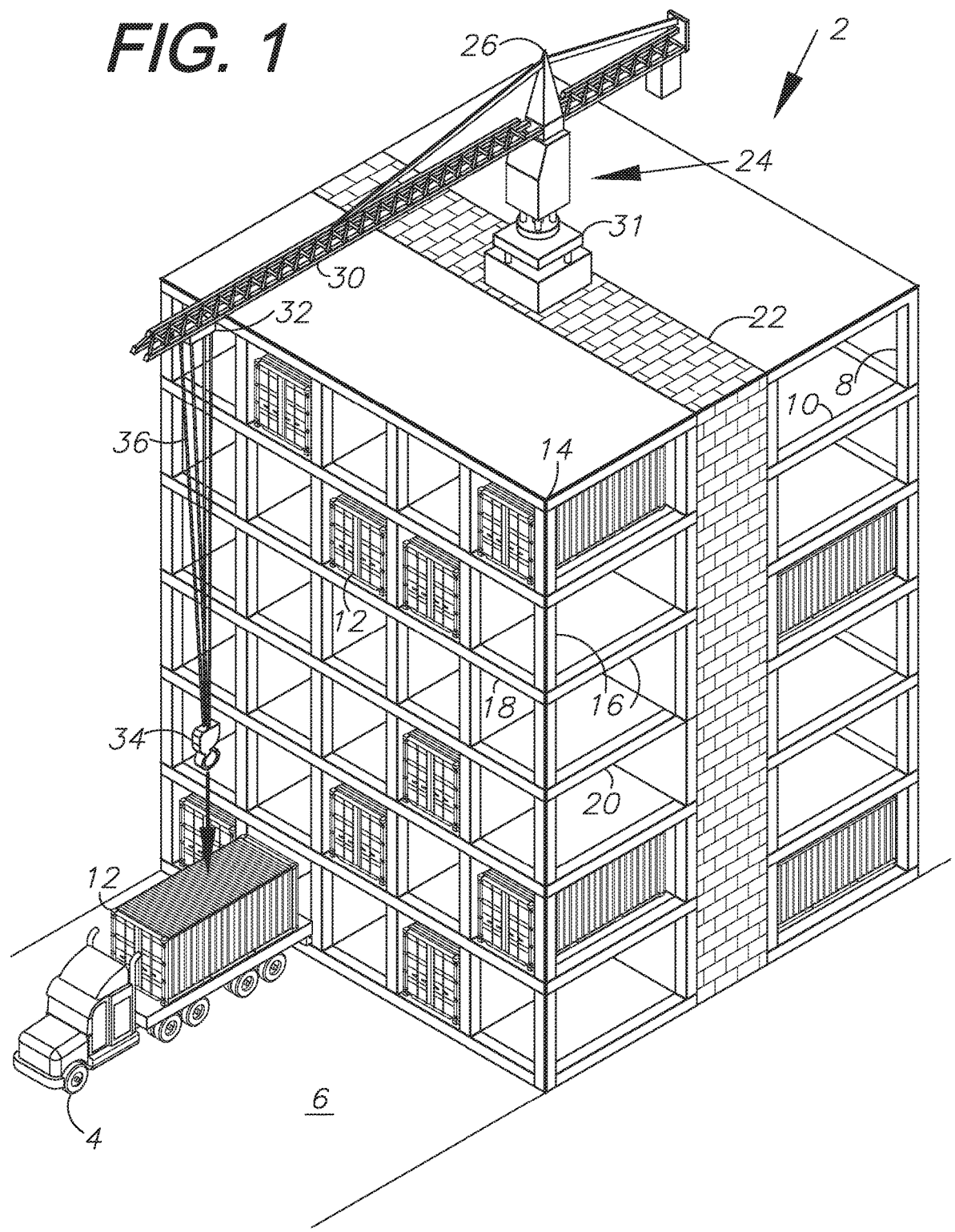
FIG. 1 is an isometric view of a structure for modular units comprising an embodiment of the present invention and including a top-mounted crane.
Figure 2:
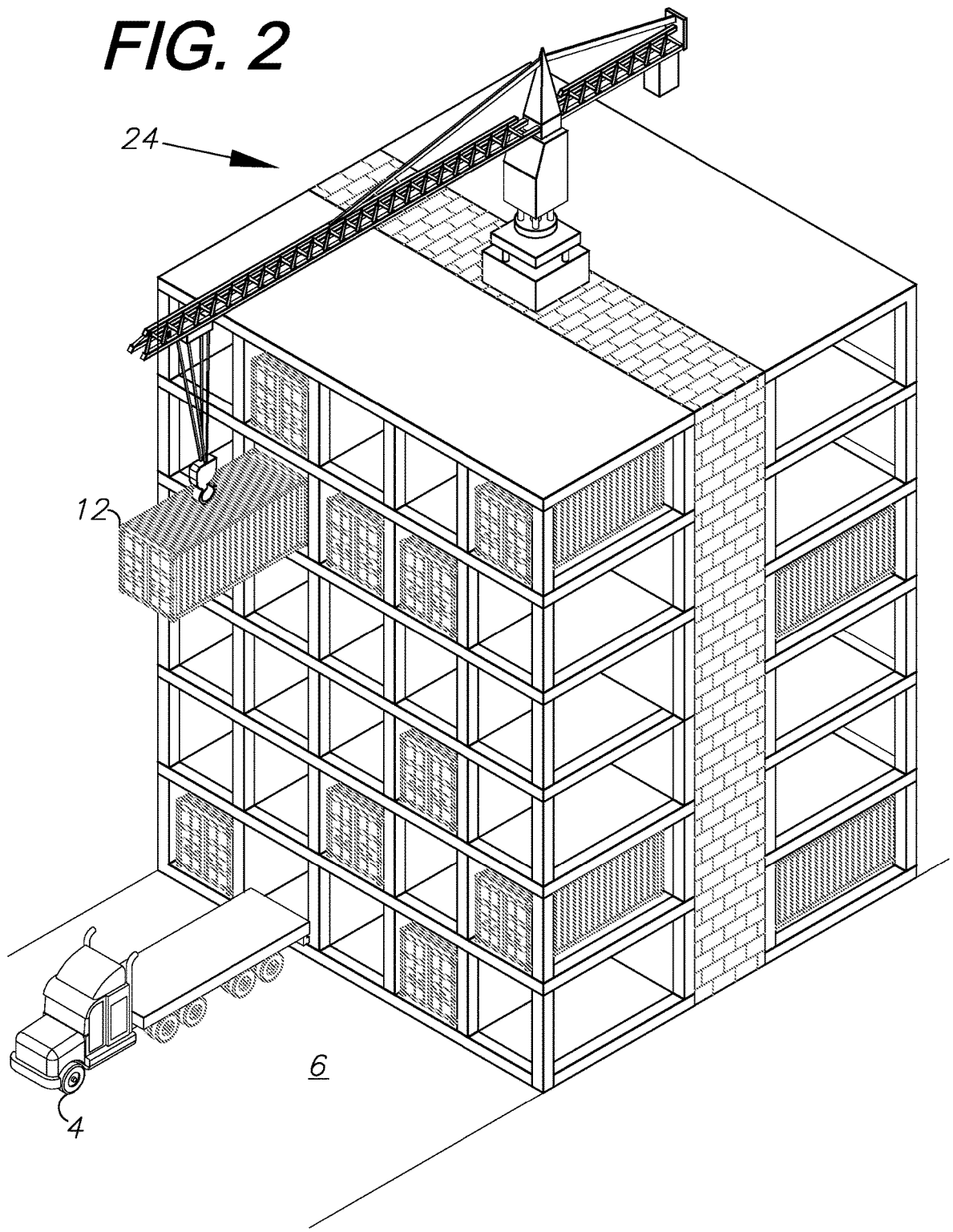
FIG. 2 is a first elevational view of the structure with a utilities unit occupying a respective bay.
Figure 3:
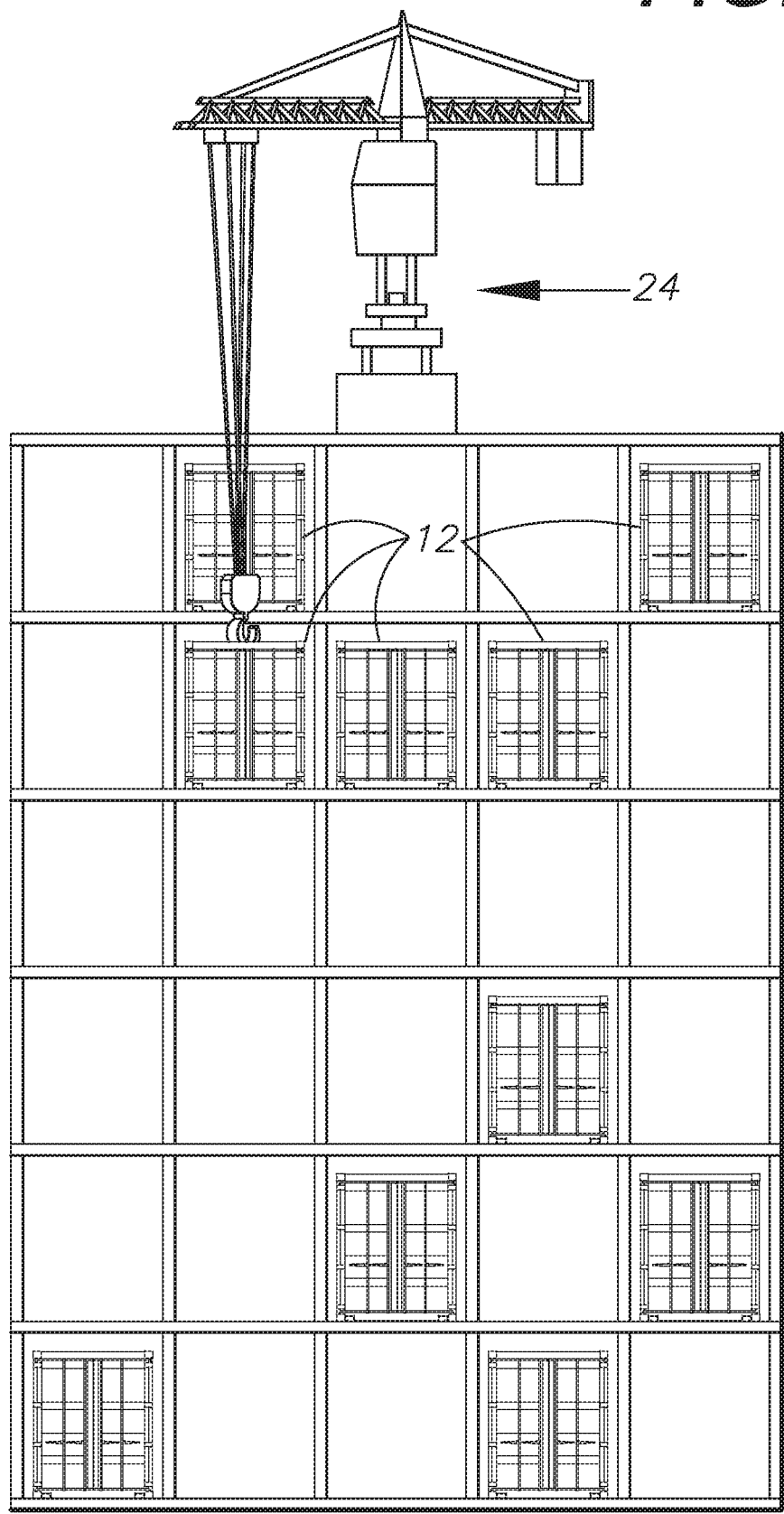
FIG. 3 is a second elevational view of the structure.
Figure 4:
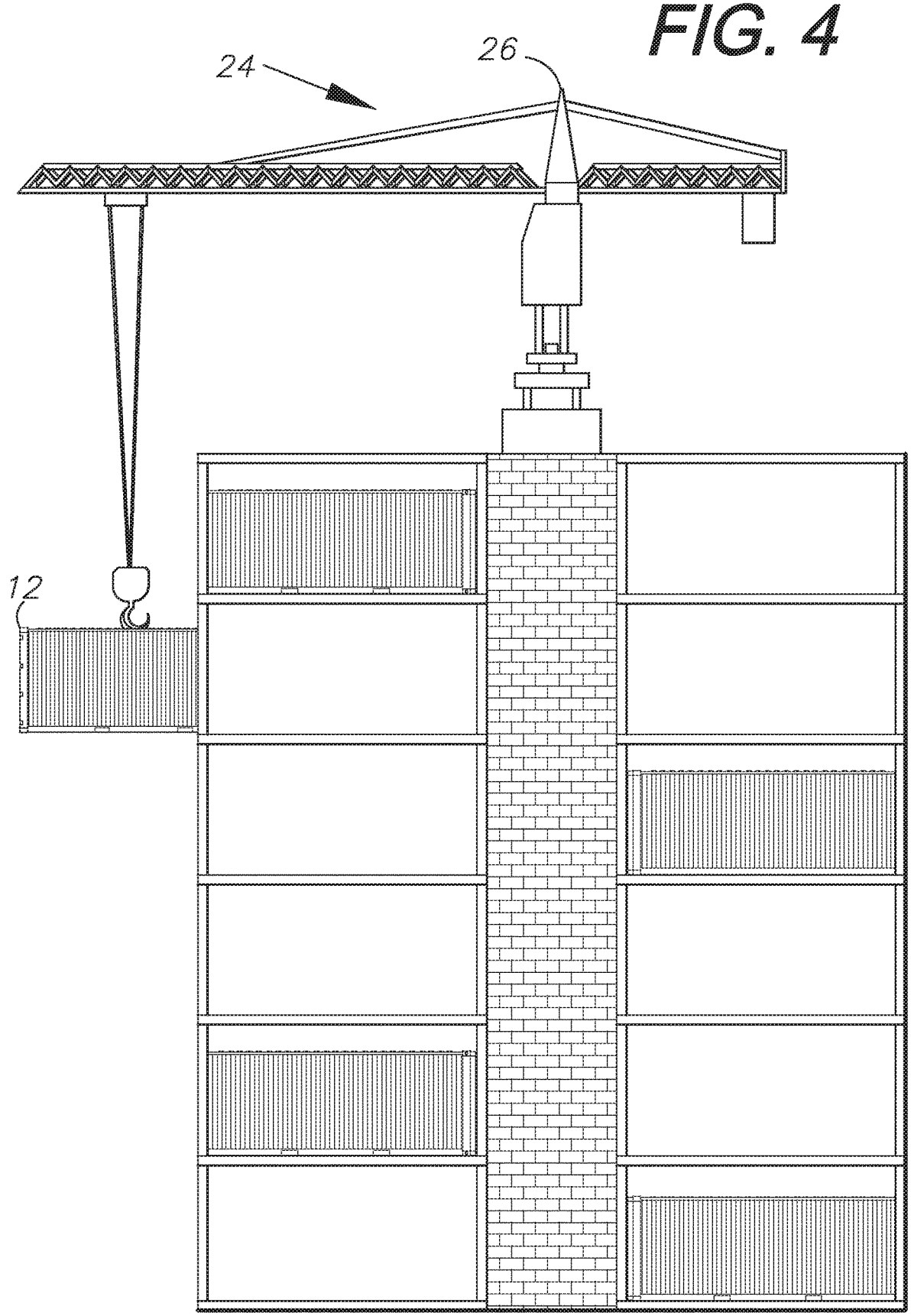
FIG. 4 is an elevational view, showing insertion of a utilities unit with a top-mounted crane.

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Modular Utilities Unit Structure 2

The reference numeral 2 generally designates a modular utilities unit structure body an aspect of the present invention. The structure is scalable and can be sited on relatively small parcels of land. Moreover, the structure can be elevated and constructed within a wide range of buildings, including high-rise office and residential buildings. For example, a specific floor can be utilized for the utility units, with floors for other purposes above and/or below.

Access for delivering and removing the utility units can be provided with trucks 4 over paved surfaces 6. For rail access the structure 2 can be located in a right-of-way next to a rail spur or siding. Marine access can be provided by locating the structure 2 along a waterfront. In addition to the cranes shown, loading and unloading can be accomplished by using special-purpose gantry cranes, which are commonly used in terminal facilities for loading and unloading ISO containers.

The structure 2 can be constructed of steel, reinforced concrete and other suitable arterials. The structure 2 can be supported on columns or legs 8, and can be elevated to facilitate parking vehicles at ground level on the paved surface 6 below the elevated structure. For example, the structure 2 can be located above existing surface parking lots without sacrificing parking facilities. The structure can also include a modular data center with individual utilities units 12 equipped with computers, data links, power sources and related equipment. Other applications include hybrid energy sources, which can utilize solar, wind, fuel cell, geothermal, etc. for primary or secondary backup energy. Power transmission infrastructure, including power transmission and distribution lines, can thus be minimized. A modular data center can be integrated with modular battery energy storage containers.

The open configuration of the structure 2 facilitates efficiently placing and removing the units 12. For example, specific utility needs can be addressed by placing the appropriate utilities units 12, or adapting existing units 12 as utilities needs change. The modular system of the present invention can accommodate a wide variety of applications, equipment and functionalities, with the advantage of efficient and cost-effective reconfiguration. For example, telecommunications (including satellite, microwave and hardwired), data centers, power sources and security-surveillance functions could be accommodated. Moreover, the system is scalable in all dimensions. Complete systems and components thereof could readily be transported virtually anywhere to accommodate local needs, either on a temporary or permanent basis. By way of further non-limiting example, emergency services, such as power and communications, could be accommodated in areas experiencing natural disasters.

In addition to fixed-location structures, the invention can be used in mobile structures, e.g. on-board marine vessels (e.g., container ships), railcars, over-the-road trucks, aircraft, spacecraft, etc.

The columns 8 and the beams 10 form a skeletal frame 14 including multiple unit bays, with end openings 18 and side openings 20, and a core 22. The core 22 can include circulation, such as steps and elevators, support infrastructure, batteries, fuel, telecommunications, workshops and other facilities supporting the functionality of the structure 2. The core 22 can include an integrated cooling tower, which can be modular, for maintaining environmental control over data center equipment, e.g., in the utilities units 12. Moreover, the utility units 12 can include such cooling and data center equipment. The configurations of systems embodying the present invention are scalable and flexible whereby functional components, including modules, can be added as needed for specific applications. For example, distributed energy resources business models and strategies can be implemented using aspects of the present invention.

III. Placement Subassembly 24

Figure 5:
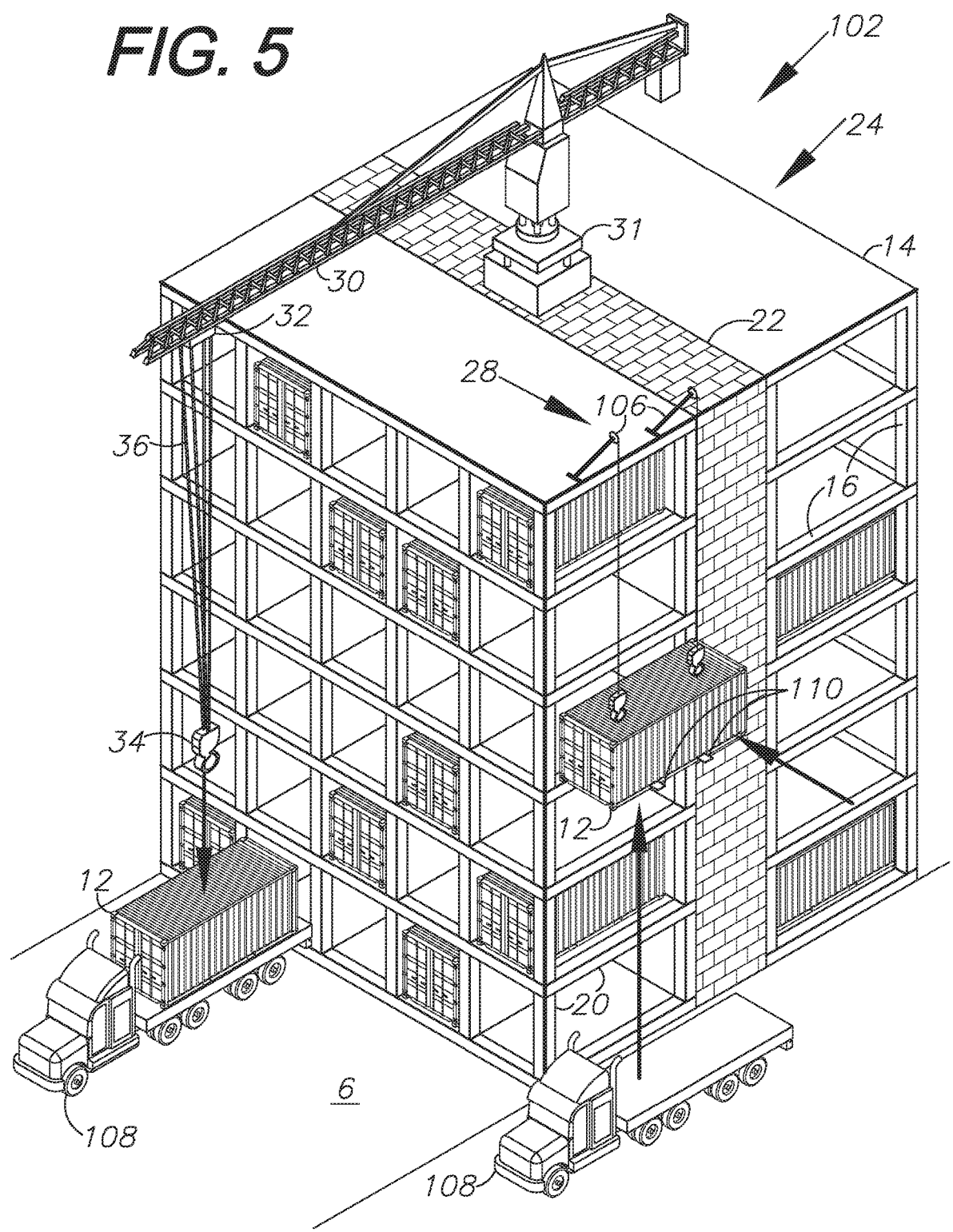
FIG. 5 is an isometric view of a structure comprising a modified or alternative embodiment of the present invention, with a gantry crane, shown placing a utilities unit in a structure bay.

A placement subassembly 24 is configured to efficiently place the units 12 in bays 16 and on transportation, such as trucks 4. Without limitation the generality of useful cranes, jacks, elevators and lifts, a top-mounted crane 26 (FIGS. 1-5) and a side-mounted gantry crane 28 are shown (FIG. 5). The top-mounted crane 26 includes a boom 30, which is rotatable in a horizontal plane and mounted on a swivel base 31. The boom 30 slidably mounts a traveler 32, which adjusts the position of a hook assembly 34 attached to a hoisting cable 36.

FIG. 5 shows an alternative or modified embodiment structure 102 including the gantry crane 28 with a pair of cable hoists or winches 106 placed in spaced relation on top of the structure 102 and configured for raising and lowering utilities units 12 from a vehicle 108, which can be parked alongside the structure 102. When a utilities unit 12 reaches the level of a corresponding bay 16, the blades 110 extend from the side of the structure 102 into bottom receivers in the utilities units 12 for supporting same. The hook assemblies 34 are disconnected and the blades 110 are then retracted into the structure 102 whereby the unit 12 is positioned substantially within the structure 102. Other mechanical mechanisms, including hydraulic piston-and-cylinder units, telescopic tubes, block-and-tackle, sprocket-and-chain assemblies, etc. can be utilized for placing utilities units. For example, bays 16 can be equipped with reciprocating, extendable-retractable shelves for supporting the utilities units 12.

IV. Conclusion

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A structure for modular utilities units, which comprises:
   a frame including columns, beams extending between the columns, opposite sides, opposite ends and a frame top;
   multiple bays formed in the frame, each said bay being open at a respective frame end opening or side opening or both;
   a utilities unit placement subassembly mounted on said frame and configured for inserting utilities units into and retracting utilities units from said bays through the frame end openings and side openings, said placement subassembly including:
   1) a rotating crane mounted on top of said structure, said rotating crane including a base rotatable on a vertical axis and a boom extending horizontally from said base, said rotating crane including a cable connected to said boom and mounting a hook connected to said cable and configured for engaging a respective utilities unit, said rotating crane configured for raising and lowering said respective utilities unit along a respective frame end and extending said respective utilities unit lengthwise into and out of a respective bay end opening;
   2) a gantry crane mounted on top of and adjacent to a side of said structure, said gantry crane including a pair of cable hoists mounted in spaced relation on top of the structure and configured for raising and lowering said respective utilities unit; and
   3) a pair of arms configured for extending laterally from a side of said structure and retracting into the side of said structure, said arms configured for supporting said respective utilities unit, placing said respective utilities unit laterally in a bay in a storage position and extending said respective utilities unit laterally from the bay to a raise-lower position alongside the structure.

2. The structure according to claim 1 wherein a respective utilities unit includes an electrical power source.

3. The structure according to claim 1 wherein said respective utilities unit includes telecommunications components.

4. The structure according to claim 1 wherein said respective utilities unit includes a water source.

5. The structure according to claim 1 wherein said respective utilities unit includes a computer configured for data processing and a data connection configured for transferring data to and from said computer.

6. The structure according to claim 1 wherein said structure includes a core adjacent to said bays and including support equipment chosen from the list comprising: power, telecommunications, water, data storage and fuel cells.

7. The structure according to claim 6 wherein said core includes vertical circulation within said structure and comprising stairs or an elevator.

\* \* \* \* \*